(12) United States Patent
Lee

(10) Patent No.: US 12,386,395 B2
(45) Date of Patent: Aug. 12, 2025

(54) ELECTRONIC DEVICE COMPRISING ELECTRONIC PEN STORAGE STRUCTURE, AND ELECTRONIC PEN

(71) Applicant: Samsung Electronics Co., Ltd., Suwon-si (KR)

(72) Inventor: Sungjin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 18/453,700

(22) Filed: Aug. 22, 2023

(65) Prior Publication Data

US 2023/0393630 A1 Dec. 7, 2023

Related U.S. Application Data

(63) Continuation of application No. PCT/KR2022/002452, filed on Feb. 18, 2022.

(30) Foreign Application Priority Data

Feb. 23, 2021 (KR) .................. 10-2021-0023836

(51) Int. Cl.
G06F 1/16 (2006.01)
(52) U.S. Cl.
CPC .......... *G06F 1/1656* (2013.01); *G06F 1/1601* (2013.01); *G06F 2200/1632* (2013.01)
(58) Field of Classification Search
CPC ................ G06F 1/1607; G06F 1/1656; G06F 2200/1632
See application file for complete search history.

(56) References Cited

U.S. PATENT DOCUMENTS

| 6,435,749 | B1 | 8/2002 | Lecce |
| 7,623,121 | B2 | 11/2009 | Dodge |
| 8,405,641 | B2 | 3/2013 | Tseng |
| 9,152,181 | B2 | 10/2015 | Lee et al. |

(Continued)

FOREIGN PATENT DOCUMENTS

| JP | 2007299234 A | 11/2007 |
| KR | 20060135086 A | 12/2006 |

(Continued)

OTHER PUBLICATIONS

Extended European Search Report dated Jun. 11, 2024 for EP Application No. 22759988.3.

(Continued)

*Primary Examiner* — Adrian S Wilson
(74) *Attorney, Agent, or Firm* — Nixon & Vanderhye P.C.

(57) ABSTRACT

An electronic device may include: a housing; a hole formed in a portion of the housing; a storage space that is connected to the hole and extends into the housing; and a fastener that is disposed in the storage space and fastens an external electronic device, wherein the fastener comprises: a support part for fixing the fastener to the storage space; a coupler which extends from the support part and in the center of which an opening for inserting the external electronic device is formed; and two or more cutout parts formed by cutting out a portion of the coupler, wherein the cutout parts may form a repulsive force against an external force in an inward direction or an outward direction of the opening.

15 Claims, 16 Drawing Sheets

(56) References Cited

U.S. PATENT DOCUMENTS

| | | | |
|---|---|---|---|
| 10,817,078 B2 * | 10/2020 | Yoo | G06F 1/1656 |
| 2013/0050922 A1 | 2/2013 | Lee et al. | |
| 2013/0135798 A1 | 5/2013 | Cheng | |
| 2016/0190839 A1 | 6/2016 | Otsuka et al. | |

FOREIGN PATENT DOCUMENTS

| | | |
|---|---|---|
| KR | 20080005584 U | 11/2008 |
| KR | 100887279 B1 | 3/2009 |
| KR | 20100088487 A | 8/2010 |
| KR | 101523486 B1 | 5/2015 |
| KR | 101873054 B1 | 7/2018 |

OTHER PUBLICATIONS

International Search Report for PCT/KR2022/002452 mailed May 24, 2022, 3 pages.
Written Opinion of the ISA for PCT/KR2022/002452 mailed May 24, 2022, 5 pages.

* cited by examiner

ELECTRONIC DEVICE COMPRISING ELECTRONIC PEN STORAGE STRUCTURE, AND ELECTRONIC PEN

CROSS-REFERENCE TO RELATED APPLICATIONS

This application is a continuation of International Application No. PCT/KR2022/002452 filed on Feb. 18, 2022, designating the United States, in the Korean Intellectual Property Receiving Office, and claiming priority to KR Patent Application No. 10-2021-0023836 filed on Feb. 23, 2021, in the Korean Intellectual Property Office, the disclosures of all of which are hereby incorporated by reference herein in their entireties.

BACKGROUND

Field

Various example embodiments relate to an electronic device including a structure that is capable of storing an electronic pen and/or an electronic pen that is capable of being stored in the electronic device.

Description of Related Art

An electronic device may receive various inputs from the user by means of an input device (e.g., a digital pen) connected with the electronic device using wireless communication. The electronic device may receive input from a pen-type input device (hereinafter referred to as a "digital pen" for convenience).

Recently, various external electronic devices (e.g., a digital pen) have been developed that may be used as an adjunct to electronic devices. Accordingly, a structure capable of storing and/or fixing an external electronic device (e.g., a digital pen) outside or inside the electronic device may be formed.

SUMMARY

In a storage structure in which an electronic device stores a digital pen, a mounting space inside the electronic device may be utilized in case that the storage structure is formed outside the electronic device. In contrast, there is an effect of increasing portability of the digital pen in case that the storage structure is formed inside the electronic device. In case that the storage structure is formed inside the electronic device, the type of constituent elements that form the storage structure and a mounting position may affect utilization of a limited space inside a housing of the electronic device.

In addition, in case that the digital pen is stored inside the electronic device, but not aligned to be stored according to a structure in which the digital pen is inserted and fixed to the electronic device, e.g., an offcenter occurs, scratches on the electronic device or the digital pen may occur.

An electronic device according to various example embodiments may include: a housing; a hole formed in a portion of the housing; a storage space that is connected, directly or indirectly, to the hole and extends into the housing; and a fastening member that is disposed in the storage space and fastens an external electronic device, in which the fastening member may include: a support part for fixing the fastening member to the storage space; a coupling part which extends from the support part and in the center of which an opening for inserting the external electronic device is formed; and two or more cutout parts formed by cutting out a portion of the coupling part, in which the cutout parts may form a repulsive force against an external force in an inward direction or an outward direction of the opening.

An external electronic device according to various example embodiments may include: a housing; a first end formed at one end of the housing; and a second end formed at the other end of the housing in a direction opposite to the first end, and in which the second end may include: an inclined portion forming a slope on a surface of the pen housing by increasing in diameter in a direction from the second end toward the first end; a catching groove formed at an end of the inclined portion in a direction toward the first end, and including a diameter smaller than a maximum diameter formed by the inclined portion; and a planar portion extending from the catching groove and configured to interrupt the catching groove in a direction perpendicular to the diameter.

According to various example embodiments, the digital pen may be aligned and stored in the electronic device to prevent or reduce damage to the electronic device and/or the digital pen.

According to various example embodiments, it is possible to increase utilization of mounting space inside the electronic device.

BRIEF DESCRIPTION OF DRAWINGS

In connection with the description of the drawings, the same or similar reference numerals may be used for the same or similar components. The above and other aspects, features and advantages of certain embodiments of the present disclosure will be more apparent from the following detailed description, taken in conjunction with the accompanying drawings, in which.

DETAILED DESCRIPTION

Figure 1:
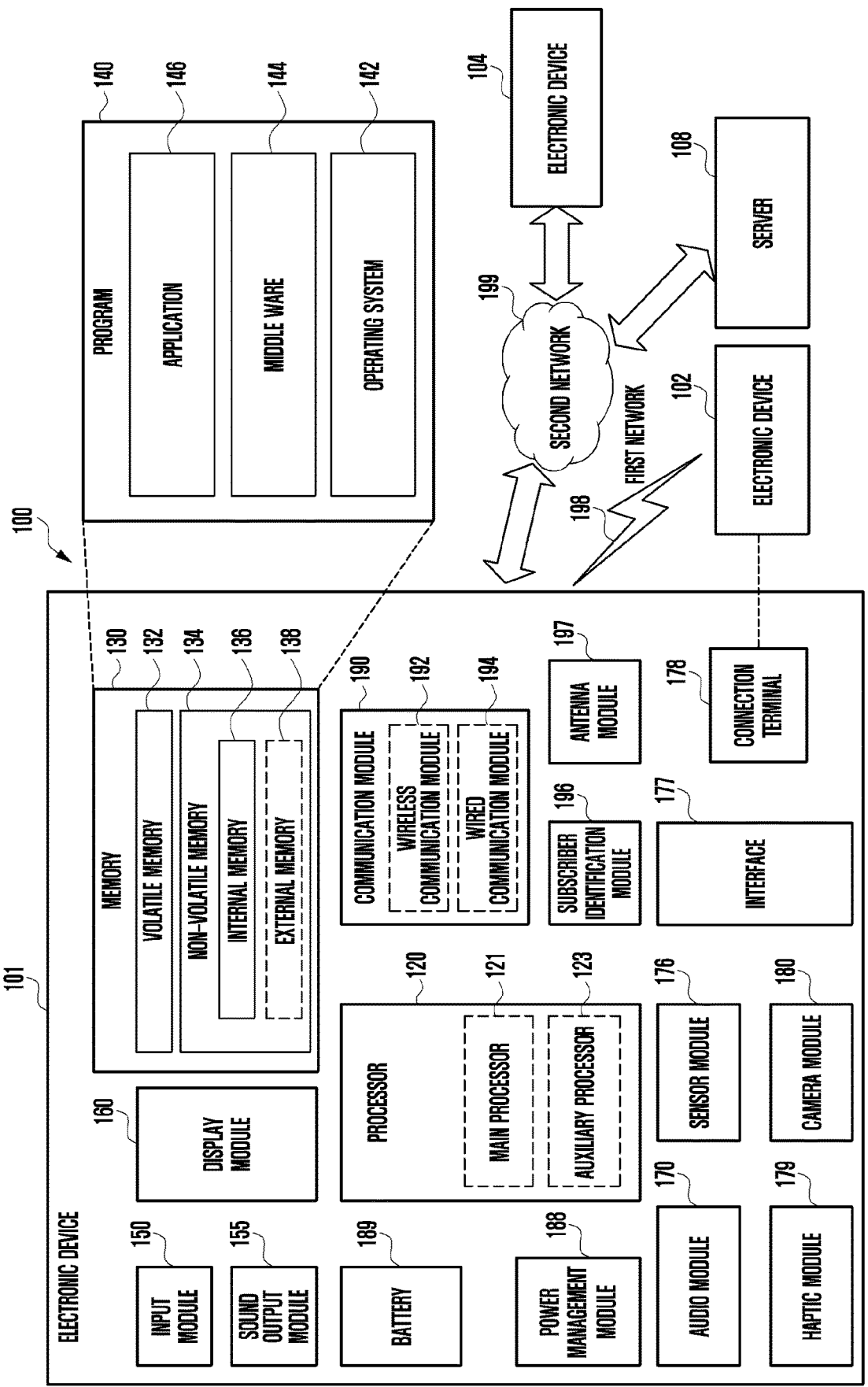
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
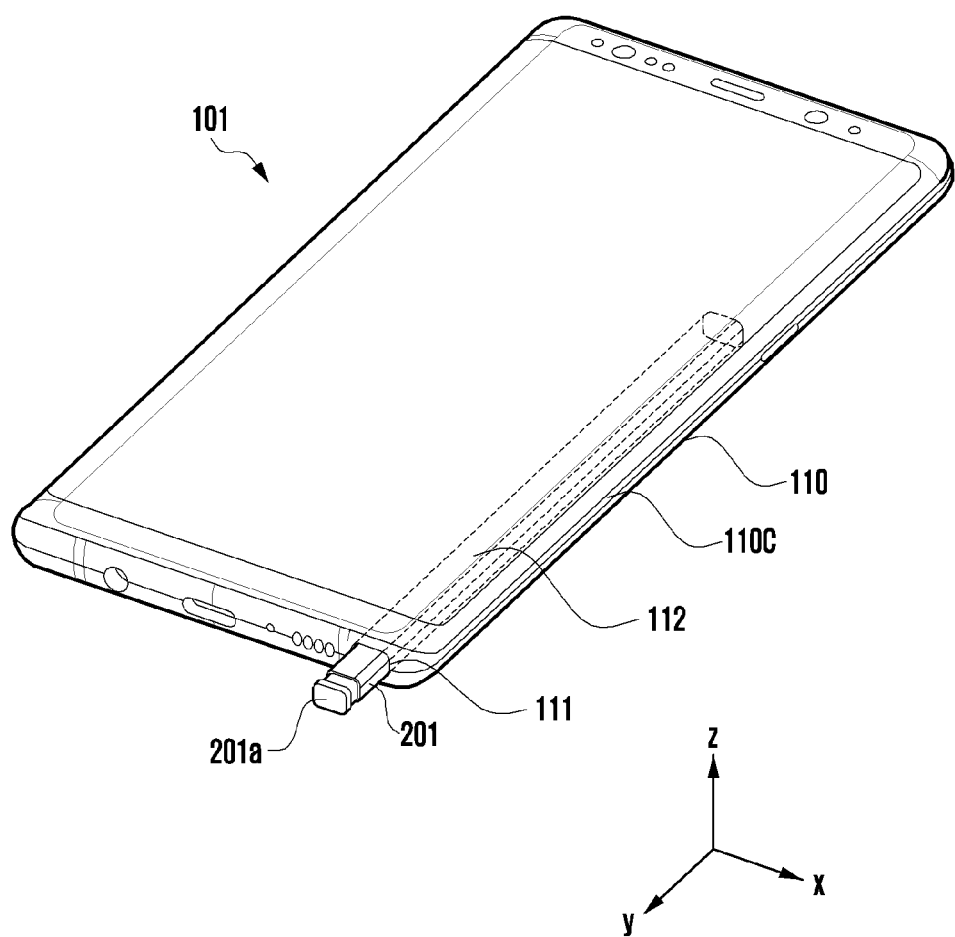
FIG. 2 is a perspective view illustrating the electronic device according to an example embodiment, including a digital pen.

FIG. 2 is a perspective view illustrating the electronic device according to an embodiment, including a digital pen.

Figure 3:
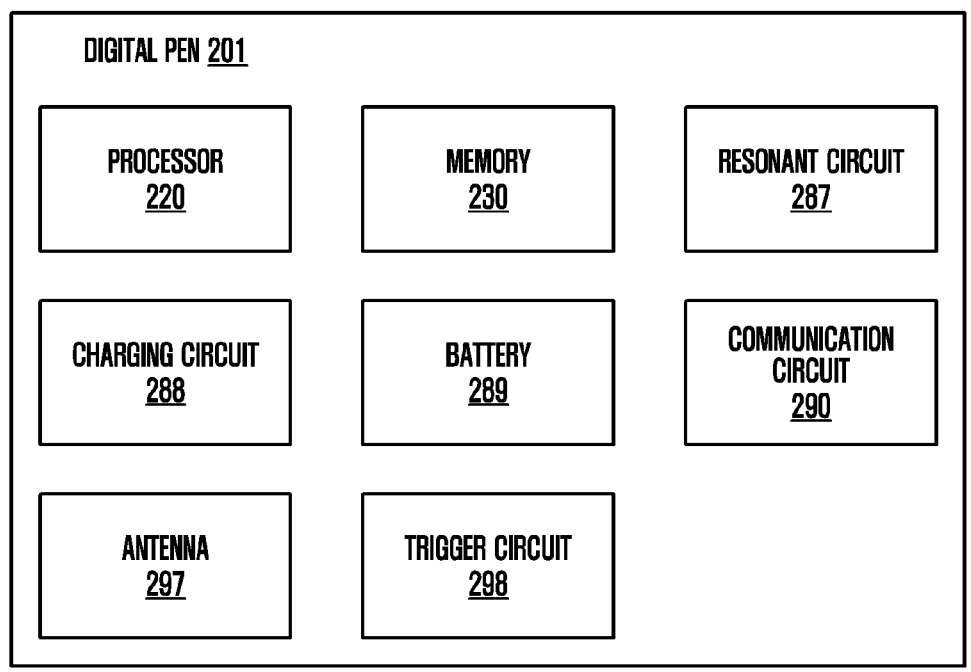
FIG. 3 is a block diagram illustrating the digital pen according to an example embodiment.

FIG. 3 is a block diagram illustrating the digital pen according to an embodiment.

Figure 4:
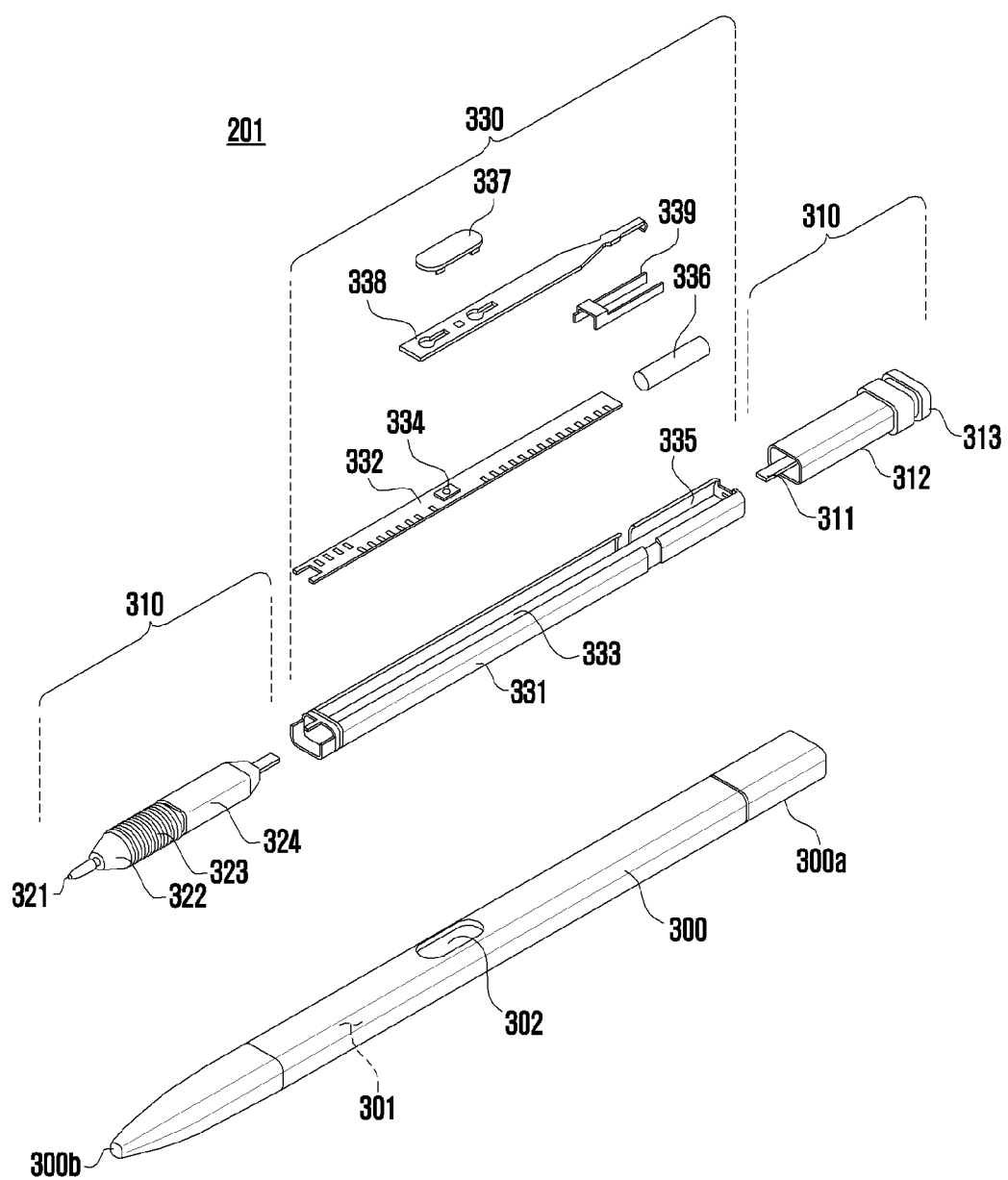
FIG. 4 is an exploded perspective view illustrating the digital pen according to an example embodiment.

FIG. 4 is an exploded perspective view illustrating the digital pen according to an embodiment.

With reference to FIG. 2, the electronic device 101 according to an embodiment may include the constitution illustrated in FIG. 1, and may include a structure into which a digital pen 201 (e.g., a stylus pen) may be inserted. The electronic device 101 includes a housing 110, and a portion of the housing, such as a portion of a side surface 110C, may include a hole 111. The electronic device 101 may include a storage space 112 connected, directly or indirectly, to the hole 111, and the digital pen 201 may be inserted in the storage space 112. According to the illustrated embodiment, the digital pen 201 may include, at one end thereof, a pressable button 201a to facilitate removal of the digital pen 201 from the storage space 112 of the electronic device 101. When the button 201a is pressed, a repulsion mechanism (e.g., at least one spring) that is constituted in conjunction with the button 201a may be activated to separate the digital pen 201 from the storage space 112.

With reference to FIG. 3, the digital pen 201 according to an embodiment may include a processor 220, a memory 230, a resonant circuit 287, a charging circuit 288, a battery 289, a communication circuit 290, an antenna 297, and/or a trigger circuit 298. In some embodiments, the processor 220, at least a portion of the resonant circuit 287, and/or at least a portion of the communication circuit 290 of the digital pen 201 may be constituted on a printed circuit board or in the form of a chip. The processor 220, resonant circuit 287, and/or communication circuit 290 may be electrically connected, directly or indirectly, with the memory 230, charging circuit 288, battery 289, antenna 297, or trigger circuit 298. The digital pen 201 according to an embodiment may be constituted by only the resonant circuit and a button.

The processor 220 may include a generic processor constituted to execute a customized hardware module or software (e.g., an application program). The processor may include hardware constituent elements (functions) or software elements (programs) that include at least one of various sensors provided in the digital pen 201, a data measurement module, an input/output interface, a module to manage a state or environment of the digital pen 201, or a communication module. The processor 220 may include one or more combinations of hardware, software, or firmware, for example. According to an embodiment, the processor 220 may receive a proximity signal corresponding to an electromagnetic field signal generated by a digitizer 160 of the electronic device 101 over a resonant circuit 287. Once the proximity signal is confirmed, the resonant circuit 287 may be controlled to transmit an electro-magnetic resonance (EMR) input signal to the electronic device 101.

The memory 230 may store information related to an operation of the digital pen 201. For example, the information may include information on communicating with the electronic device 101 and frequency information related to an input operation of the digital pen 201.

The resonant circuit 287 may include at least one of a coil, an inductor, or a capacitor. The resonant circuit 287 may be utilized that the digital pen 201 generates a signal including a resonant frequency. For example, to generate the signal, the digital pen 201 may utilize at least one of an electro-magnetic resonance (EMR) method, an active electrostatic (AES) method, or an electrically coupled resonance (ECR) method. In case that the digital pen 201 transmits a signal by EMR method, the digital pen 201 may generate a signal including a resonant frequency based on an electromagnetic field generated by an inductive panel of the electronic device 101. In case that the digital pen 201 transmits a signal by the AES method, the digital pen 201 may utilize capacity coupling with the electronic device 101 to generate the signal. In case that the digital pen 201 transmits a signal by the ECR method, the digital pen 201 may generate a signal including a resonant frequency based on an electric field generated by a capacitive device of the electronic device. According to an embodiment, the resonant circuit 287 may be utilized to change intensity or frequency of an electromagnetic field based on a user's operational state. For example, the resonant circuit 287 may provide a frequency to recognize a hovering input, a drawing input, a button input, or an erasing input.

In case that the charging circuit 288 is connected, directly or indirectly, to the resonant circuit 287 based on a switching circuit, a resonant signal generated by the resonant circuit 287 may be rectified into a direct current signal and provided to the battery 289. According to an embodiment, the digital pen 201 may utilize a voltage level of a direct current signal detected by the charging circuit 288 to determine whether the digital pen 201 has been inserted into the electronic device 101.

The battery 289 may be constituted to store power required to operate the digital pen 201. The battery may include, for example, a lithium-ion battery, or a capacitor, and may be rechargeable or replaceable. According to an embodiment, the battery 289 may be charged using power (e.g., a direct current signal (DC power)) provided by the charging circuit 288.

The communication circuit 290 may be constituted to perform a wireless communication function between the digital pen 201 and the communication module 190 of the electronic device 101. According to an embodiment, the communication circuit 290 may transmit state information and input information of the digital pen 201 to the electronic device 101 using a short-range communication method. For example, the communication circuit 290 may transmit to the electronic device 101 direction information (e.g., motion sensor data) on the digital pen 201 obtained by the trigger circuit 298, voice information inputted by a microphone, or battery level information on the battery 289. In an example, the short-range communication method may include at least one of Bluetooth, Bluetooth low energy (BLE), or wireless LAN.

The antenna 297 may be utilized to transmit signals or power to, or receive from, an external source (e.g., the electronic device 101). According to an embodiment, the digital pen 201 may include a plurality of antennas 297, of which at least one antenna 297 may be selected that is suitable for a communication method. The communication circuit 290 may exchange signals or power with an external electronic device via the selected at least one antenna 297.

The trigger circuit 298 may include at least one button or sensor circuit. According to an embodiment, the processor 220 may identify an input method (e.g., touch or press) or type (e.g., EMR button or BLE button) of a button on the digital pen 201. According to an embodiment, the sensor circuit may generate electrical signals or data values that correspond to an internal operational state of the digital pen 201 or an external environmental state. For example, the sensor circuit may include at least one of a motion sensor, a battery level detection sensor, a pressure sensor, a light sensor, a temperature sensor, a geomagnetic sensor, and a biometric sensor. According to an embodiment, the trigger circuit 298 may utilize an input signal from a button or a signal from a sensor to transmit a trigger signal to the electronic device 101.

With reference to FIG. 4, the digital pen 201 may include a pen housing 300, which constitutes an outline of the digital pen 201, and an inner assembly inside the pen housing 300. In the illustrated embodiment, the inner assembly, including all of the various components that are mounted inside the pen, may be inserted inside the pen housing 300 in a single assembly operation.

The pen housing 300 may have an elongated shape between a first end 300a and a second end 300b, and may include the storage space 112 therein. The pen housing 300 may be elliptical in cross-section with a long axis and a short axis, and may be formed overall in the shape of an elliptical column. The storage space 301 of the electronic device 101 may also be formed elliptically in cross-section, corresponding to the shape of the pen housing 300. The pen housing 300 may include a synthetic resin (e.g., plastic) and/or a metallic material (e.g., aluminum). According to an embodiment, the second end 300b of the pen housing 300 may be constituted of a synthetic resin material.

The inner assembly may have an elongated shape corresponding to the shape of the pen housing 300. The inner assembly may be divided into three constituents along the lengthwise direction. For example, the inner assembly may include an ejection member 310 disposed in a position corresponding to the first end 300a of the pen housing 300, a coil part 320 disposed in a position corresponding to the second end 300b of the pen housing 300, and a circuit board part 330 disposed in a position corresponding to a body of the housing.

The ejection member 310 may include a constituent configured to eject the digital pen 201 from the storage space 112 of the electronic device 101. According to an embodiment, the ejection member 310 may include a shaft 311, an ejection body 312 disposed around the perimeter of the shaft 311 and forming an overall outline of the ejection member 310, and a button part 313. When the inner assembly is fully inserted into the pen housing 300, a portion including the shaft 311 and the ejection body 312 may be enclosed by the first end 300a of the pen housing 300, and the button part 313 (e.g., 201a in FIG. 2) may be exposed to the outside of the first end 300a. A plurality of components not illustrated, such as cam members or resilient members, may be disposed within the ejection body 312 to form a push-pull structure. In an embodiment, the button part 313 may be coupled substantially with the shaft 311 to perform a linear reciprocating motion relative to the ejection body 312. According to various embodiments, the button part 313 may include a button with a catch structure formed to allow a user to pull out the digital pen 201 using a fingernail. According to an embodiment, the digital pen 201 may include a sensor to detect the linear reciprocating motion of the shaft 311, thereby providing another input method.

The coil part 320 may include a pen tip 321 exposed to the outside of the second end 300b when the inner assembly is fully inserted into the pen housing 300, a packing ring 322, a plurally wound coil 323, and/or a pen pressure sensing part 324 configured to obtain a change in pressure depending on pressurization of the pen tip 321. The packing ring 322 may include epoxy, rubber, urethane, or silicone. The packing ring 322 may be provided for waterproofing and dustproofing purposes, and may protect the coil part 320 and the circuit board part 330 from water immersion or dust. According to an embodiment, the coil 323 may form a resonant frequency in a configured frequency band (e.g., 500 kHz), and may be combined with at least one element (e.g., a capacitive element (capacitor)) to modulate the resonant frequency formed by the coil 323 in some range.

The circuit board part 330 may include a printed circuit board 332, a base 331 that surrounds at least one surface of the printed circuit board 332, and an antenna. According to an embodiment, a board resting part 333 is formed on an upper surface of the base 331 on which a printed circuit board 332 is disposed, and the printed circuit board 332 may be fixed in a resting state on the board resting part 333. According to an embodiment, the printed circuit board 332 may include a top surface and a bottom surface, and a variable capacitance capacitor or switch 334 connecting to the coil 323 may be disposed on the top surface, and the charging circuit, battery, or communication circuit may be disposed on the bottom surface. The battery may include an electric double layered capacitor (EDLC). The charging circuit is positioned between the coil 323 and the battery, and may include voltage detector circuitry and a rectifier.

The antenna may include an antenna structure 339 such as the example illustrated in FIG. 4 and/or an antenna embedded in the printed circuit board 332. According to various embodiments, the switch 334 may be provided on the printed circuit board 332. A side button 337 provided on the digital pen 201 is utilized to push the switch 334 and may be exposed to the outside through a side surface opening 302 of the pen housing 300. The side button 337 is supported by a support member 338 and may be restored or maintained in a state in which the side button 337 is disposed in a predetermined position by the support member 338 providing elastic resilience when there is no external force acting on the side button 337.

The circuit board part 330 may include other packing rings, such as an O-ring. For example, an O-ring made of an elastic material may be disposed at each end of the base 331 to form a sealing structure between the base 331 and the pen housing 300. In some embodiments, the support member 338 may tightly fit against an inner wall of the pen housing 300, partially around the side surface opening 302, to form a sealing structure. For example, the circuit board part 330 may also form a waterproof, dustproof structure similar to the packing ring 322 of the coil part 320.

The digital pen 201 may include a battery resting part 335 where a battery 336 is disposed on an upper surface of the base 331. The battery 336 that may be mounted in the battery resting part 335 may include, for example, a cylinder type battery.

The digital pen 201 may include a microphone (not illustrated). The microphone may be connected directly to the printed circuit board 332, or may be connected, directly or indirectly, to a separate flexible printed circuit board (FPCB) (not illustrated) that is connected to the printed circuit board 332. According to various embodiments, the microphone may be disposed in a position parallel to the side button 337 in the longitudinal direction of the digital pen 201.

Figure 5A:
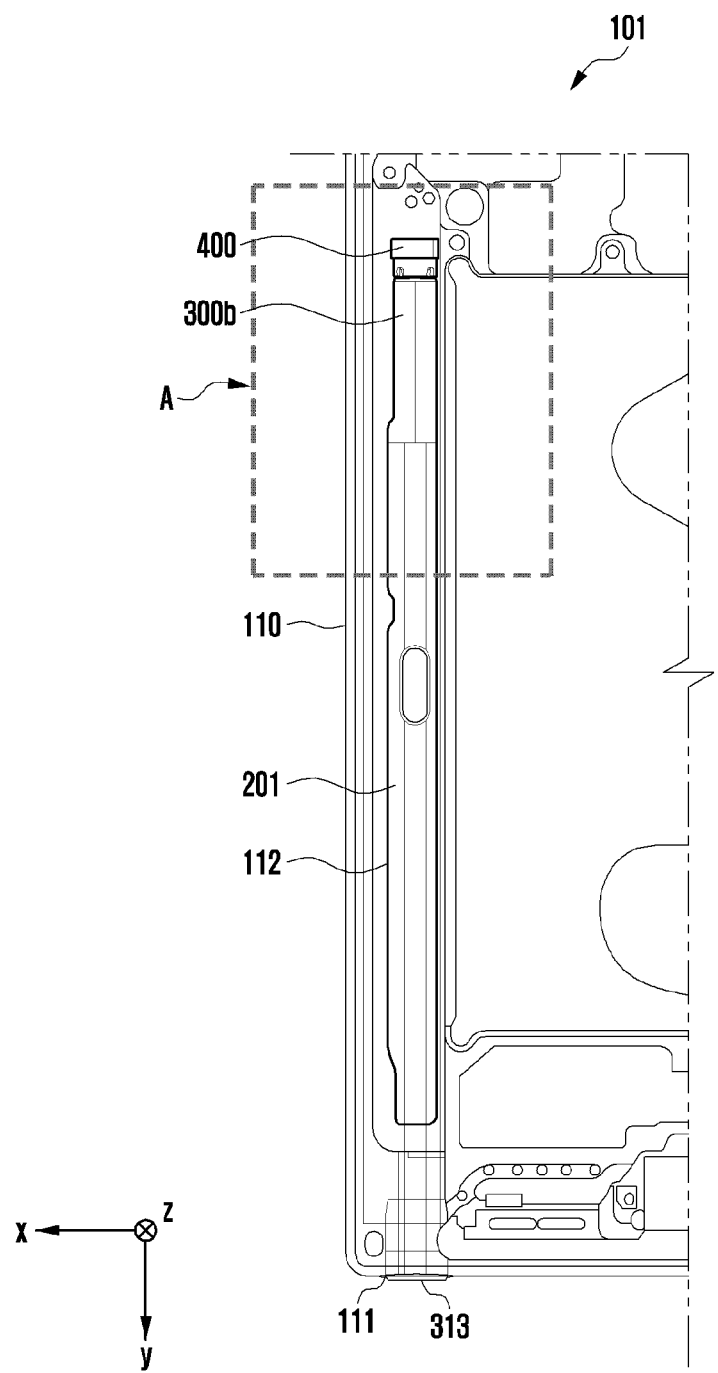
FIG. 5A is a view illustrating a structure for mounting a digital pen according to various example embodiments.

FIG. 5A is a view illustrating a structure for mounting a digital pen according to various embodiments.

Figure 5B:
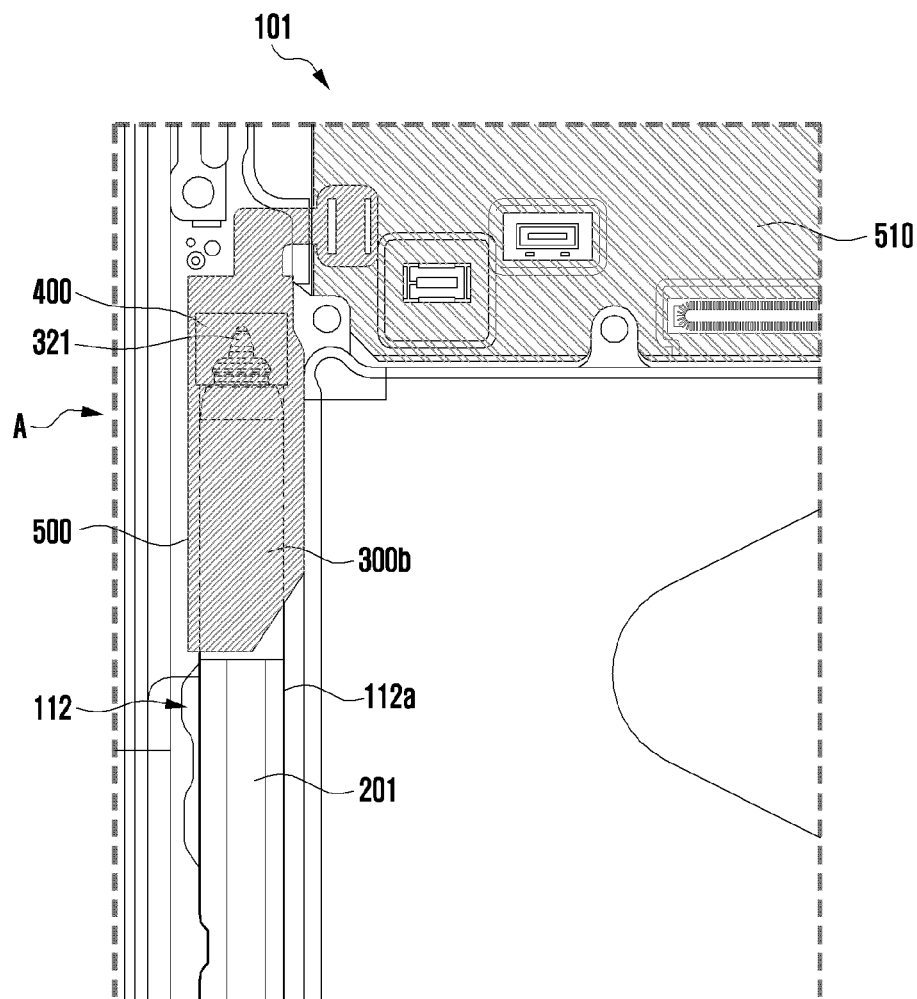
FIGS. 5B and 5C are enlarged views illustrating a partial area of FIG. 5A.
Figure 5C:
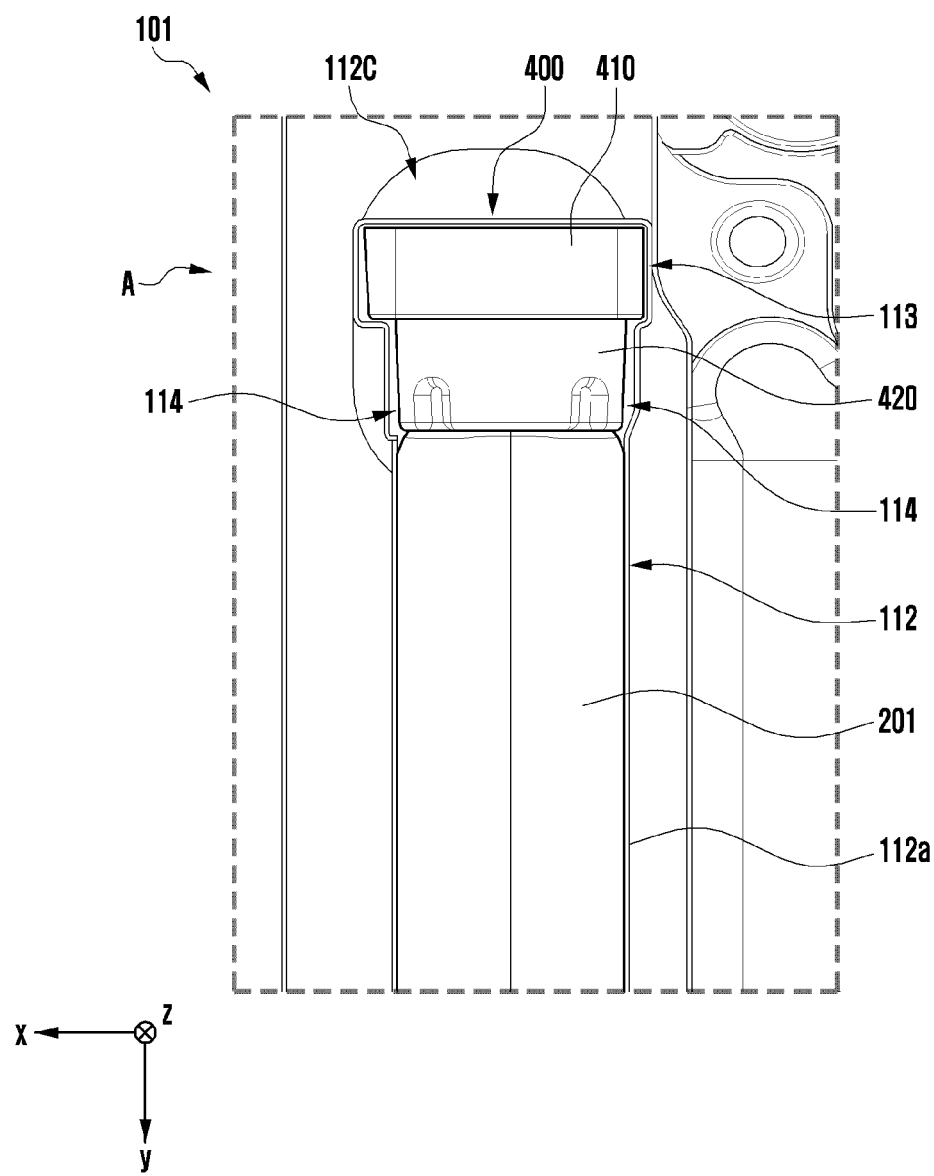

FIGS. 5B and 5C are enlarged views illustrating a partial area of FIG. 5A.

With reference to FIGS. 5A, 5B, and 5C, a mounting structure including at least the hole 111, the storage space 112, and a fastening member/fastener 400 may be formed to mount the digital pen 201 inside the housing 110 of the electronic device 101.

According to various embodiments, the housing 110 may form an opening, such as the hole 111, on one side surface thereof. According to an embodiment, the hole 111 may form a size substantially equal to the cross-section of the digital pen 201. According to an embodiment, a diameter of the hole 111 may be equal to or greater than a maximum or large diameter of the digital pen 201.

According to various embodiments, the storage space 112 may be a space formed to extend from the hole 111 to a direction towards the inside of the housing 110 (e.g., in the opposite direction of the y-axis). According to an embodiment, most of an area of the storage space 112 (e.g., a connecting passage 112a) may be a space that an opening having the same diameter as the hole 111 extends through and forms. For example, a diameter of the connecting passage 112a may be the same as a diameter of the hole 111. According to an embodiment, a size of the diameter formed by the connecting passage 112a may be equal to or greater than a maximum or large diameter formed by the digital pen 201. According to an embodiment, a length that the storage space 112 has (e.g., a length of the y-axis direction) may be equal to or greater than a length formed by the digital pen 201.

According to various embodiments, the digital pen 201 may be inserted inside the electronic device 101. According to various embodiments, the digital pen 201 may be inserted into the electronic device 101 in a specific direction. According to various embodiments, at least one of the both ends of the digital pen 201 (e.g., the first end 300a or the second end 300b in FIG. 4) may be inserted into the electronic device 101. According to an embodiment, the digital pen 201 may be inserted into the electronic device 101 beginning from the second end 300b.

According to various embodiments, the digital pen 201 may be inserted into the electronic device 101 from the hole 111 and stored in the storage space 112. According to an embodiment, the digital pen 201 may be slidingly inserted into the storage space 112 according to a structure formed by the storage space 112. According to various embodiments, a portion of the digital pen 201 that has been inserted (e.g., a portion of the button part 313) may protrude outside of the hole 111. According to an embodiment, the protruding button part 313 may reciprocate relative to the ejection body (e.g., the ejection member 312 in FIG. 4) when pressurized, and a catching structure included in the button part 313 may be exposed outside of the housing 110 to catch and eject the digital pen 201.

According to various embodiments, the electronic device 101 may identify whether the digital pen 201 has been inserted into the electronic device 101. According to an embodiment, the electronic device 101 may radiate an electromagnetic field and/or an electric field to the digital pen 201. With reference to FIG. 5B, the electronic device 101 may include at least one printed circuit board (e.g., a first printed circuit board 510 and a second printed circuit board 500). According to an embodiment, the first printed circuit board 510 is electrically connected, directly or indirectly, to the second printed circuit board 500 and a battery (e.g., the battery 189 in FIG. 1), and the second printed circuit board 500 may receive power from the battery 189 via the first printed circuit board 500. According to an embodiment, the second printed circuit board 500 may output an electromagnetic field signal and/or an electric field signal to resonate with the digital pen 201. According to an embodiment, the second printed circuit board may be disposed at a position corresponding to at least a portion of the digital pen 201 (e.g., the second end 300b) in case that the digital pen 201 is stored. According to an embodiment, the second printed circuit board 500 may generate a resonant signal by the digital pen 201 in case that the digital pen 201 is inserted, and the electronic device 101 may detect the resonant signal to identify whether the digital pen 201 is inserted.

According to various embodiments, the digital pen 201 may be inserted and fixed inside the storage space 112. With reference to FIG. 5C, the fastening member/fastener 400 may be disposed in at least a portion of the storage space 112. According to various embodiments, the digital pen 201 may be fixed inside the storage space 112 by being at least partially engaged with the fastening member 400. According to an embodiment, the fastening member 400 may fix the digital pen 201 to the storage space 112. According to various embodiments, the fastening member 400 may be disposed inside the housing 110 such that a center thereof is aligned with the digital pen 201. According to an embodiment, the storage space 112 may include the communicating part 112a, which is formed to extend so that the digital pen 112 may be inserted, and a mounting area 112c, in which the fastening member 400 may be mounted. According to an embodiment, the fastening member 400 may be mounted in the mounting area 112c. According to an embodiment, the mounting area 112c is formed in the form of a groove and may include interruption part 113 that interrupts at least some area of the fastening member 400. According to various embodiments, the fastening member 400 may include a support part 410 that fixes the fastening member 400 inside the mounting area 112c and a coupling part/coupler 420 that is coupled to the digital pen 201. According to an embodiment, the support part 410 may have a larger diameter than the coupling part/coupler 420, and may form a stepped structure (e.g., a stepped part 411 in FIG. 6C) that is formed by a diameter difference from the coupling part 420. According to an embodiment, the stepped part formed by the support part 410 (e.g., the stepped part 411 in FIG. 6C) may be fixed inside the mounting area 112c with being interrupted by the interruption part 113 included in the mounting area 112c. According to an embodiment, the mounting area 112c may include a clearance 114 to include a range in which a portion of the fastening member 400 (e.g., the coupling part 420) deforms. According to an embodiment, the coupling part 420 may spread in a left-right direction (e.g., along the x-axis and/or opposite the x-axis) while coupling with the digital pen 201, and may extend in a direction in which the clearance 114 is formed. According to an embodiment, the fastening member 400 may be disposed to be aligned in one direction (e.g., in the y-axis direction) when the digital pen 201 is inserted. Therefore, the digital pen 201 may be aligned without an offcenter and inserted inside the electronic device 101.

Figure 6A:
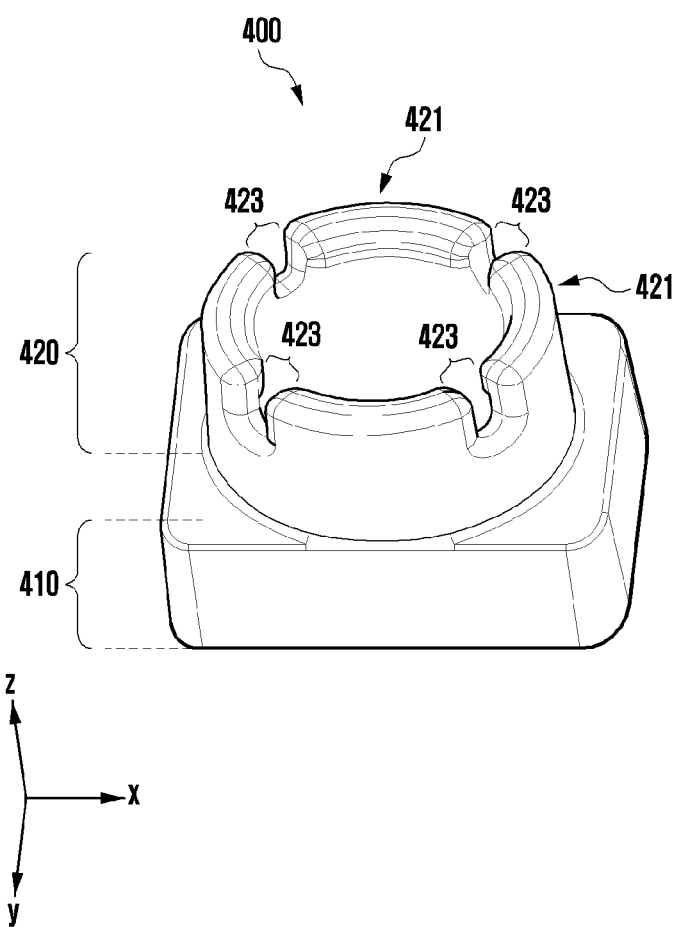
FIG. 6A is a perspective view illustrating the fastening member according to various example embodiments.

FIG. 6A is a perspective view illustrating the fastening member 400 according to various embodiments.

Figure 6B:
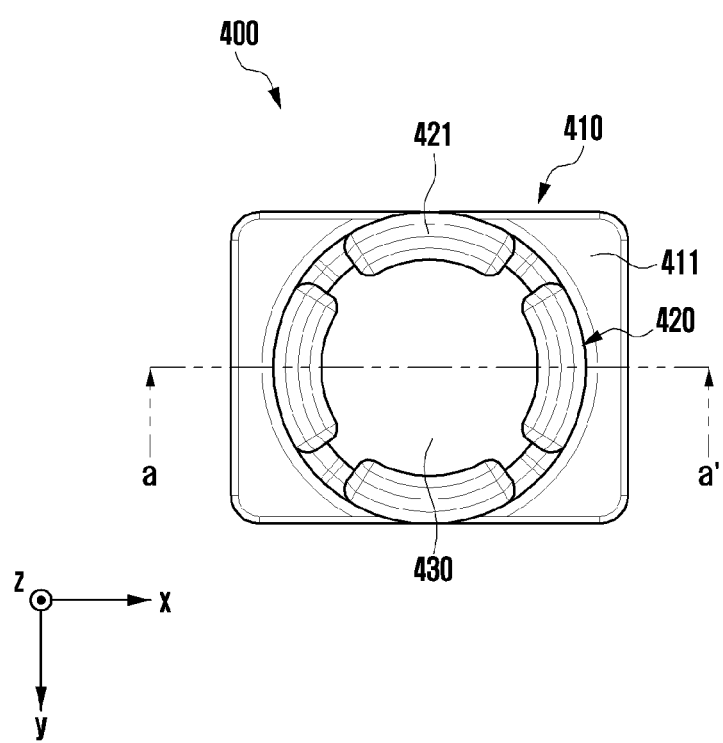
FIG. 6B is a top view illustrating the fastening member according to various example embodiments.

FIG. 6B is a top view illustrating the fastening member 400 according to various embodiments.

Figure 6C:
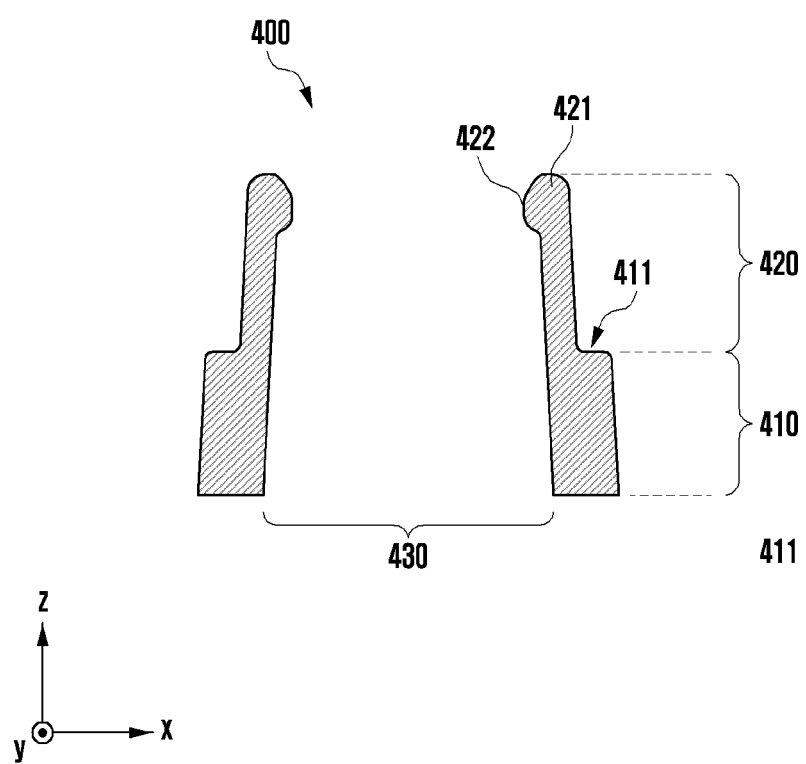
FIG. 6C is a cross-sectional view illustrating the fastening member according to various example embodiments.

FIG. 6C is a cross-sectional view illustrating the fastening member 400 according to various embodiments.

Figure 6D:
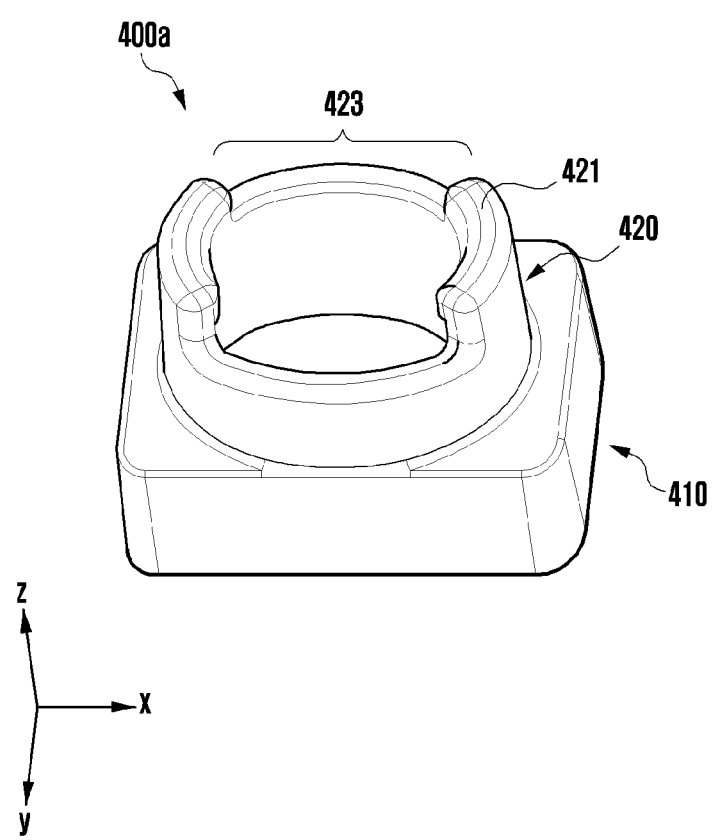
FIG. 6D is a perspective view illustrating the fastening member according to various example embodiments.

FIG. 6D is a perspective view illustrating the fastening member 400 according to various embodiments.

FIG. 6C may be a cross-sectional view in which the fastening member 400 is cut along line aa' (e.g., the line aa' in FIG. 6B).

With reference to FIGS. 6A, 6B, and 6C, the fastening member 400 may include the support part 410 and the coupling part 420.

The fastening member/fastener 400 may be fixed to the storage space 112 by the support part 410. According to various embodiments, the fastening member 400 may be mounted and fixed to some area (e.g., the mounting area 112c in FIG. 5C) of the storage space (e.g., the storage space 112 in FIG. 5C). According to an embodiment, a diameter of the support part 410 may be less than or equal to the mounting area 112c in the storage space 112, and may be greater than other areas of the storage space 112 (e.g., the connecting passage 112a in FIG. 5C). According to an embodiment, the stepped part 411 formed on the support part 410 may be fixed inside the mounting area 112c with being interrupted by the interruption part (e.g., the interruption part 113 in FIG. 5C) formed by a difference in diameters of the mounting area 112c and the connecting passage 112a.

The coupling part/coupler 420 may fix the digital pen (e.g., the digital pen 201 in FIG. 2). According to an embodiment, the coupling part 420 may include a structure protrudingly extending from the support part 410 and including a circular and/or substantially circular opening 430 therein into which the digital pen 201 is inserted.

According to an embodiment, the opening 430 may include a structure that is circular and/or substantially circular in cross-section, and may be formed continuously from the coupling part 420 to the support part 410. According to an embodiment, the digital pen 201 may be inserted into the fastening member/fastener 400 through the opening 430. According to an embodiment, the cross-section of the opening 430 may be a shape corresponding to cross-section of a top portion of the digital pen 201 (e.g., a top portion 701 in FIG. 7A). According to an embodiment, a maximum or large diameter of the cross-section of the opening 430 may be greater than or equal to a maximum or large diameter formed by an area of the top portion 701 of the digital pen 201. According to various embodiments, the digital pen 210 may be inserted from the opening 430 and coupled to the coupling part 420. According to various embodiments, the coupling part 420 may include a cutout structure including at least two cutout parts 421. According to an embodiment, the cutout part 421 may be a portion formed by a cutout clearance 423 that is cut out in some area of the coupling part 420. According to various embodiments, the cutout part 421 may form a repulsive force against an external force. According to an embodiment, the cutout part 421 may form a repulsive force in an outward direction (e.g., in a direction opposite the opening 430) against an external force acting inwardly, that is, in a direction toward the opening 430. According to an embodiment, the cutout part 421 may apply a repulsive force inwardly against an external force acting outwardly, that is, in the opposite direction of the opening 430. According to an embodiment, the cutout part 421 may be bent and deformed by an external force in a direction of the external force. Therefore, elastic and/or tensile forces may be applied by deformation to apply a repulsive force in the opposite direction of the external force. According to an embodiment, the cutout part 421 may include a catching projection 422 protruding from a portion thereof. The catching projection 422 may be formed at some area of the cutout part 421, such as at an end of the cutout part 421 in a direction opposite the support part 410 from the cutout part 421. According to an embodiment, different catching projections 422 formed in different cutout portions 421 may be symmetrically formed with respect to the opening 430. According to an embodiment, at least one catching projection 422 may be formed on each cutout part 421, and a plurality of catching projections 422 may be formed on a plurality of cutout parts 421. According to an embodiment, the plurality of catching projections 422 may be disposed to face each other in the direction of the opening 430.

Referring to FIG. 6B, FIG. 6B may be a top view illustrating the fastening member/fastener 400 when viewed from the top of the fastening member 400. With reference to FIG. 6B, the coupling part 420 in the shape of a planar may be substantially circular. According to various embodiments, the cross-sectional shape of the opening 430 formed across the coupling part 420 and the support part 410 may be substantially circular. According to an embodiment, a shape (e.g., cross-section) of the support part 410 may be substantially rectangular when viewed from the top of the support part 410. According to an embodiment, the horizontal length (e.g., a length in the x-axis direction) of the support part 410 may be formed in a range that is at least greater than a diameter of the communicating part 112a According to an embodiment, the vertical length (e.g., a length in the y-axis direction) of the support part 410 may be equal to or greater than a maximum diameter of the coupling part 420. According to an embodiment, the horizontal length of the support part 410 may be greater than the vertical length of the support part 410. According to an embodiment, an area formed by a difference between a longer length and a shorter length among the horizontal length and the vertical length of the support part 410, that is, an area excluding an area formed by a cross-section of the coupling part 420 from an area formed by a cross-section of the support part 410, may form a step (e.g., the stepped part 411) with the coupling part 420.

With reference to FIG. 6C, a cross-section of the fastening member/fastener 400 may be a cross-section in which the fastening member/fastener 400 is cut along line aa' in FIG. 6B. According to various embodiments, the opening 430 may be formed inside of the support part 410 and the coupling part/coupler 420. According to an embodiment, the opening 430 may be formed such that the diameter thereof decreases as the opening 430 progresses in a direction (e.g., in the z-axis direction) from the support part 410 toward the coupling part 420. According to various embodiments, at least a portion of the digital pen 201 may be inserted into the opening 430 by inserting the digital pen 201 from the connecting passage 112a into the storage space 112. According to an embodiment, the coupling part 420 may be coupled to the digital pen 201 by inserting at least a portion of the digital pen 201 (e.g., the second end 300b in FIG. 4) into the opening 430. According to an embodiment, a maximum diameter of the digital pen 201 may be less than or equal to a diameter of the communicating part 112a. According to an embodiment, a maximum diameter of the opening 430 may be less than or equal to a diameter of the connecting passage 112a.

With reference to FIG. 6C, the cutout part 421 may be partially deformed in shape by an external force to form a repulsive force. For example, the cutout part 421 formed on the right side may be partially bent outwardly when subjected to an external force outwardly (e.g., in the x-axis direction), and may apply a force inwardly (e.g., in the opposite direction of the x-axis) by a repulsive force and/or an elastic force against the deformation.

With reference to FIG. 6D, the cutout part 421 may be a plurality of pieces. The coupling part 420 may be substantially circular in shape (e.g., in cross-section) when viewed from the top of the coupling part, or may be a structure formed that the coupling part 420 formed in the circular shape is cut out. Therefore, the number of cutout parts 421 may be the same as the number of the cutout clearances 423. According to various embodiments, the number of cutout parts 421 may be an even number. According to an embodiment, the number of cutout parts 421 may be four. According to an embodiment, the number of cutout parts 421 may be two. According to an embodiment, each of the plurality of cutout parts 421 may include the catching projection 422. According to an embodiment, only a portion of the plurality of cutout parts 421 may include the catching projection 422, and the remaining portion of the cutout parts 421 may not include the catching projection 422.

According to various embodiments, the fastening member/fastener 400 may include a material with elasticity. According to an embodiment, the cutout part 421 of the fastening member 400 may include a material that may be temporarily deformed in shape by an external force. Since the fastening member 400 is coupled with the digital pen 201 by temporarily being deformed upon insertion of the digital pen 201 and then restored, a resilient, but rigid material may be preferred. According to an embodiment, the fastening member 400 may include a self-lubricating material to facilitate insertion of the digital pen 201. According to an embodiment, the fastening member/fastener 400 may include a resilient material (e.g., rubber and silicone). According to an embodiment, the fastening member/fastener 400 may include a rigid material with self-lubricating property (e.g., polyoxymethylene (POM), polyamide (PA), polypropylene (PP), polycarbonate (PC), polyethylene (PE), and/or thermoplastic polyurethane (TPU)).

Figure 7A:
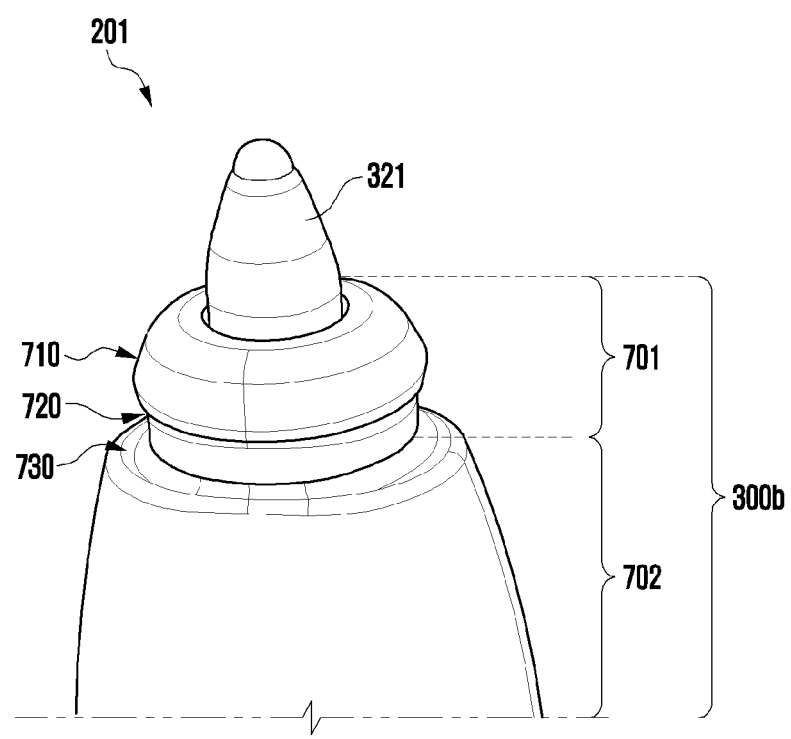
FIG. 7A is a perspective view illustrating a second end of the digital pen according to various example embodiments.

FIG. 7A is a perspective view illustrating the second end 300B of the digital pen according to various embodiments.

Figure 7B:
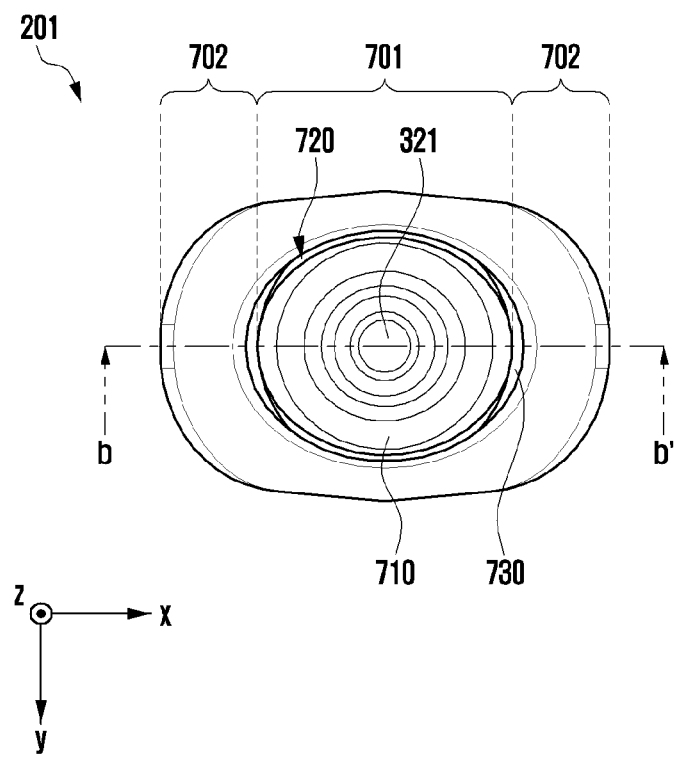
FIG. 7B is a top view illustrating the digital pen according to various example embodiments.

FIG. 7B is a top view illustrating the digital pen 201 according to various embodiments.

Figure 7C:
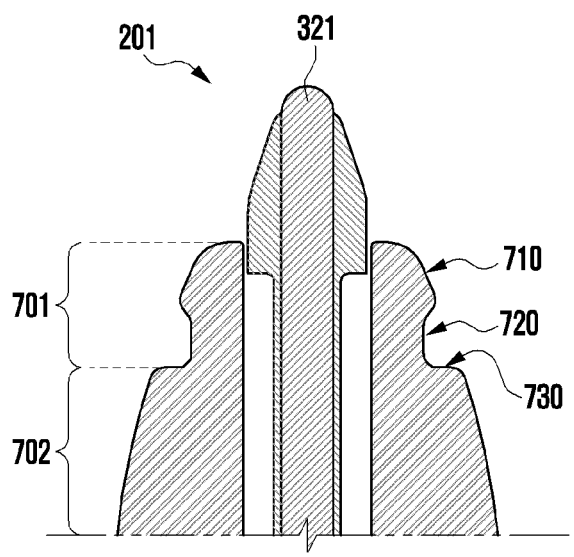
FIG. 7C is a cross-sectional view illustrating the second end of the digital pen according to various example embodiments.

FIG. 7C is a cross-sectional view illustrating the second end 300B of the digital pen according to various embodiments.

FIG. 7C may be a cross-sectional view illustrating the second end 300B of the digital pen 201 that cut along line bb' in FIG. 7B.

With reference to FIGS. 7A, 7B, and 7C, the second end 300B may include a top portion 701 and a bottom portion 702. According to an embodiment, the top portion 701 may include an inclined portion 710 and a catching groove 720. According to an embodiment, the bottom portion 702 may include a planar portion 730. According to an embodiment, the pen tip 321 may penetrate and protrude from the center of the second end 300B.

According to various embodiments, the inclined portion 710 may include a slope formed by a difference in diameters of areas corresponding to respective portions of the vertical direction (e.g., the z-axis direction) of the second end 300b. According to an embodiment, at least a portion of the surface of the second end 300B may include an area that gradually increases in diameter as the second end 300B progresses in the opposite direction of the z-axis. Therefore, as the diameter increases, a slope may be formed on the surface of the second end 300b. According to an embodiment, the inclined portion 710 may include a structure that increases in diameter from the second end 300B toward the first end (e.g., the first end 300A in FIG. 4) (e.g., in the opposite direction of the z-axis).

According to various embodiments, the catching groove 720 may include a groove formed on the surface of the second end 300b. The catching groove 720 may include, for example, an area that decreases in diameter of the second end 300b adjacent to an area that has a maximum diameter of a portion of the inclined portion 710. According to an embodiment, a diameter of the area in which the catching groove 720 is formed may be less than a maximum diameter among diameters of the area in which the inclined portion 710 is formed. According to an embodiment, the catching groove 720 may be formed in an area in the opposite direction of the z-axis from the inclined portion 710. According to an embodiment, the catching groove 720 may form a stepped structure because of a difference in diameter with the inclined portion 710.

According to various embodiments, the planar portion 730 may include a planar area. The planar area may include a planar surface perpendicular to the z-axis. According to an embodiment, the planar portion 730 may be a portion of the surface of the pen housing 300 that includes a planar surface that is perpendicular to the z-axis. With reference to FIG. 7B, a cross sectional area of the bottom portion 702 may be formed over a larger area than a cross sectional area of the top portion 701. According to an embodiment, the cross-sectional area of the bottom portion 702 may be larger than the cross-sectional area of the top portion 701. According to an embodiment, in the cross-sectional area of the bottom portion 702, at least some of the area, other than the cross-sectional area of the top portion 701, may include the planar portion 730.

With reference to FIG. 7B, the cross-section of the top portion 701 may include a substantially circular shape. According to an embodiment, each of the areas included in the top portion 701 (e.g., the inclined portion 710 and the catching groove 720) and the pen tip 321 may include a substantially circular shape in cross-section. According to an embodiment, the cross-section of each area included in the top portion 701 may form concentric circles. According to various embodiments, the cross-section of the bottom portion 702 may be larger than the cross-section of the top portion 701. According to an embodiment, the cross-section of the bottom portion 702 may include a rectangular-like shape or a substantially elliptical shape. According to an embodiment, the cross-section of the bottom portion 702 may be an elliptical shape formed by a long axis formed in the x-axis direction and a short axis formed in the y-axis direction. According to an embodiment, a short axis of the cross-section of the bottom portion 702 may be equal to or greater than a maximum diameter of the cross-section of the top portion 701. According to an embodiment, the planar portion 730 may be formed among the area of the bottom portion 702, in a range that exceeds an area with a maximum diameter of the top portion 701.

Figure 8A:
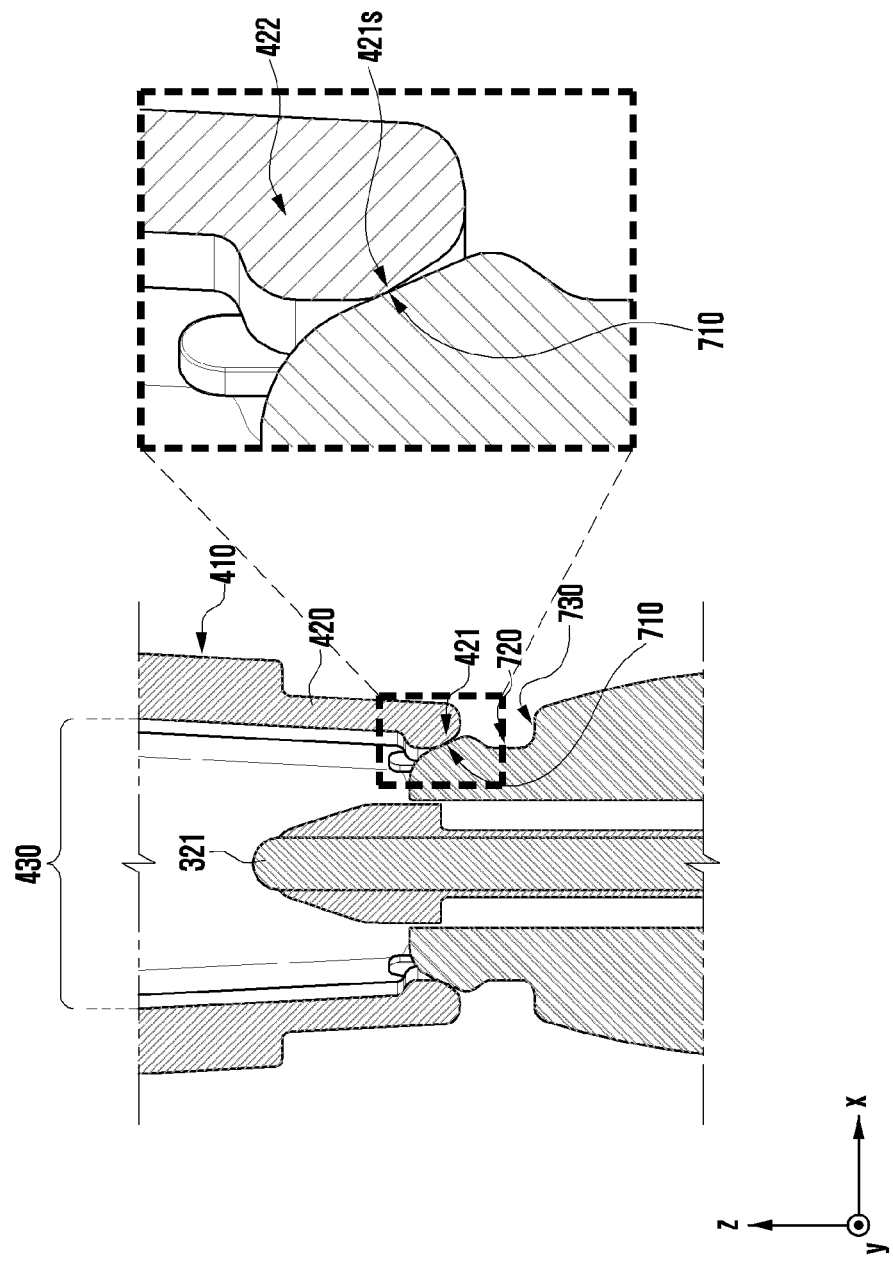
FIG. 8A is a cross-sectional view illustrating a process of coupling the digital pen with the fastening member according to various example embodiments.

FIG. 8A is a cross-sectional view illustrating a process of coupling the digital pen with the fastening member according to various embodiments.

Figure 8B:
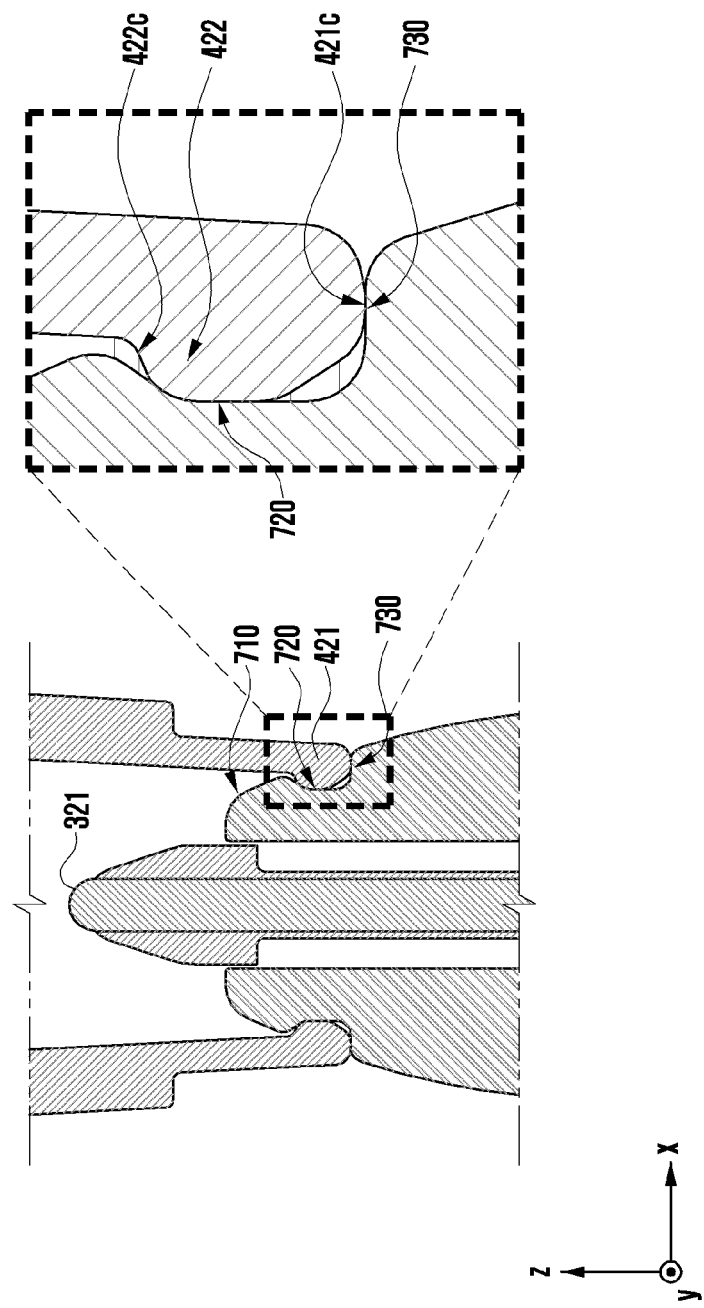
FIG. 8B is a cross-sectional view illustrating that the digital pen and fastening member are coupled according to various example embodiments.

FIG. 8B is a cross-sectional view illustrating that the digital pen and fastening member are coupled according to various embodiments.

With reference to FIGS. 8A and 8B, the fastening member/fastener 400 may be coupled with the digital pen 201. According to various embodiments, the digital pen 201 may be inserted into an electronic device (e.g., the electronic device 101 in FIG. 1). According to an embodiment, the digital pen 201 may be inserted from a hole (e.g., the hole 111 in FIG. 2) formed in at least some area of a housing (e.g., the housing 110 in FIG. 2) of the electronic device 101 and stored in a storage space (e.g., the storage space 112 in FIG. 2) extending from the hole 111. According to an embodiment, the digital pen 201 may be coupled with the fastening member 400 disposed in a mounting area (e.g., the mounting area 112c in FIG. 5C) through a communicating part (e.g., the connecting passage 112a in FIG. 5C) included in the storage space 112.

According to various embodiments, the digital pen 201 may be coupled with the coupling part 410 included in the fastening member 400. According to an embodiment, the second end 300b included in the digital pen 201 may be coupled with the coupling part 410. According to various embodiments, the digital pen 201 may be inserted into the opening 430 formed in the center of the coupling part 410. According to an embodiment, the digital pen 201 may be stored along a direction (e.g., the z-axis direction) from the hole 111 through the connecting passage 112a and inserted into the opening 430 in the same direction (e.g., the z-axis direction).

With reference to FIG. 8A, the coupling part 410 may apply a buffering force to the digital pen 201 as the digital pen 201 is inserted. The buffering force may be a force that, in response to an external force that inserts the digital pen 201, pushes the digital pen 201 in a direction opposite to the external force. According to an embodiment, a direction in which the digital pen 201 is inserted may be in the z-axis direction, and the buffering force may be formed in a direction opposite to the z-axis. According to various embodiments, a minimum diameter of the coupling portion 410, for example, a minimum diameter of a diameter formed by the opening 430 corresponding to the coupling portion, may be less than a maximum diameter of the inclined portion 710 of the digital pen 201. According to an embodiment, a minimum diameter of the inclined portion 710 may be less than or equal to a minimum diameter of the opening 430. According to an embodiment, at least a portion of the inclined portion 710 may push the cutout part 421 outwardly by the slope formed by the inclined portion 710 as the inclined portion 710 is inserted into the opening 430 and then advanced in the z-axis direction. The outward direction may be an outward direction that includes, for example, the x-axis direction and/or a direction opposite to the x-axis, relative to the opening 430. According to an embodiment, the smallest diameter of an area of the opening 430 may be an area corresponding to an area in which the catching projection 422 is formed. According to an embodiment, the catching projection 422 may include, in a portion thereof, an inclined surface 421s corresponding to the inclined portion 710. According to an embodiment, the inclined surface 421s may have the same degree of slope corresponding to the inclined portion 710, and the inclined portion 710 may be gently pushed, in contact with the inclined surface 421s, in a direction of the opening 430 (e.g., in the z-axis direction). According to an embodiment, the cutout portion 421 may open as the digital pen 201 is inserted by the slope of the inclined portion 710. According to an embodiment, the cutout portion 421 may open outwardly (e.g., in a direction opposite the opening 430) upon insertion of the digital pen 201. According to an embodiment, the open cutout portion 421 may apply a repulsive force inwardly (e.g., in a direction toward the opening 430). According to an embodiment, the cutout portion 420 may deliver a repulsive force to the inclined portion 710 through a contact surface with the inclined portion 710. According to an embodiment, the repulsive force delivered by a slope angle of the inclined portion 710 may include a force in a direction opposite to the insertion (e.g., in a direction opposite to the z-axis). For example, a combined force of repulsive force may be formed in the vertical direction of the inclined portion 710 by the slope angle, and a force in a direction opposite the z-axis may be applied to the digital pen 201 upon decomposition of the combined force. According to an embodiment, a force that pushes the digital pen 201 in a direction opposite to the z-axis may be formed by a force that is formed by a combined force of the repulsive force of the cutout part 421 and the normal drag force of the inclined portion 710. According to an embodiment, the buffering force may include a force that pushes the digital pen 201 in a direction opposite to the z-axis.

With reference to FIG. 8B, the fastening member/fastener 400 may be coupled to the digital pen 201. According to various embodiments, in case of insertion of the digital pen 201, the catching projection 422 of the fastening member 400 may pass over the inclined portion 710 and rest in the catching groove 720.

According to various embodiments, the insertion of the digital pen 201 is completed when the planar portion 730 and the cutout part 421 come into contact. According to an embodiment, the cutout part/cutout 421 may be interrupted by the planar portion 730. According to an embodiment, a contact portion 421c formed at an end of the cutout portion 421 may include a planar shape corresponding to the planar portion 730. According to an embodiment, the planar portion 730 is interrupted by the contact portion 421c and may no longer advance in the insertion direction (e.g., in the z-axis direction), and the insertion may be completed.

According to an embodiment, a diameter formed by a cross-section of an area corresponding to the catching groove 720 may be less than or equal to a diameter of the opening 430 corresponding to the catching projection 422. According to an embodiment, the diameter of the opening 430 formed inside the catching projection 422 may be less than a maximum diameter of the inclined portion 710. According to an embodiment, the catching projection 422 may be interrupted by a step formed by a difference between a diameter of the catching groove 420 and a maximum diameter of the inclined portion 710. In other words, in case that the catching projection 422 is coupled to the catching groove 720, the digital pen 201 may be coupled to the fastening member/fastener 400 with the inclined portion 710 interrupted by the catching projection 422. According to an embodiment, the coupling of the catching projection 422 and the catching groove 720 may allow the digital pen 201 to be coupled without being separated in a direction opposite to the insertion (e.g., in a direction opposite to the z-axis).

An electronic device according to various example embodiments may include: a housing; a hole formed in a portion of the housing; a storage space that is connected, directly or indirectly, to the hole and extends into the housing; and a fastening member/fastener that is disposed in the storage space and fastens an external electronic device, in which the fastening member may include: a support part for fixing the fastening member to the storage space; a coupling part which extends from the support part and in the center of which an opening for inserting the external electronic device is formed; and two or more cutout parts formed by cutting out a portion of the coupling part, in which the cutout parts may form a repulsive force against an external force in an inward direction or an outward direction of the opening.

In addition, the electronic device may include the two or more catching projections protruding from a portion of each of the two or more cutout parts, and disposed to face each other in a direction toward the opening.

In addition, the two or more cutout parts may form a symmetrical structure with respect to the opening.

In addition, a cross-section of the opening may be circular.

In addition, the two or more cutout parts may form the repulsive force in an inward direction of the opening when opened apart from each other in an outward direction of the opening.

In addition, the storage space may include a communicating part into which the external electronic device is inserted, and an interruption portion configured to interrupt the support part to move away corresponding to the support part, in which the support part may be fixed to the storage space by the interruption portion.

In addition, a diameter of the support part may be greater than a diameter of the communicating part.

In addition, a maximum diameter of the opening may be less than or equal to the diameter of the communicating part.

In addition, a diameter of the opening formed by the two or more catching projections facing each other in an area of the opening may be less than a maximum diameter of the opening.

In addition, the fastening member may include four cutout parts/cutouts.

In addition, the fastening member (or fastener) may include, for example and without limitation, any one or a combination of polyoxymethylene (POM), polyamide (PA), polypropylene (PP), polycarbonate (PC), polyethylene (PE), and thermoplastic polyurethane (TPU), or any suitable adhesive or other fastener.

In addition, the external electronic device is an electronic pen, in which the electronic pen may include: a pen housing; a first end formed at both ends of the pen housing, at least a portion of which protrudes outside of the hole upon the insertion; and a second end positioned inside the storage space upon the insertion, and in which the second end may include: an inclined portion forming a slope on a surface of the pen housing by increasing in diameter in a direction from the second end toward the first end; a catching groove formed at an end of the inclined portion in a direction toward the first end, and including a diameter smaller than a maximum diameter formed by the inclined portion; and a planar portion extending from the catching groove and configured to interrupt the catching groove in a direction perpendicular to the diameter.

In addition, a minimum diameter of the cutout part may be less than a maximum diameter of the inclined portion of the electronic pen and greater than or equal to a minimum diameter of the inclined portion of the electronic pen. A maximum diameter of the inclined portion may be greater than the minimum diameter of the cutout part.

In addition, the cutout part may be opened in an outward direction of the opening upon the insertion by the inclined portion of the electronic pen, in which the cutout part which is opened may generate a repulsive force that is applied to an area in which an end of the cutout part is in contact with the inclined portion in an inward direction of the opening, and a buffering force that pushes the electronic pen by a slope of the inclined portion in an outward direction of the housing.

In addition, the catching groove of the electronic pen, upon the insertion, may interrupt the coupling portion of the fastening member in a direction opposite to the insertion.

In addition, the planar portion of the electronic pen, upon insertion, may interrupt the coupling portion with respect to a direction of the insertion.

An external electronic device according to various example embodiments may include: a housing; a first end formed at one end of the housing; and a second end formed at the other end of the housing in a direction opposite to the first end, and in which the second end may include: an inclined portion forming a slope on a surface of the pen housing by increasing in diameter in a direction from the second end toward the first end; a catching groove formed at an end of the inclined portion in a direction toward the first end, and including a diameter smaller than a maximum diameter formed by the inclined portion; and a planar portion extending from the catching groove and configured to interrupt the catching groove in a direction perpendicular to the diameter.

In addition, the electronic device may further include: a tip disposed inside the housing, extending to the outside through the second end, and including a dielectric coil of a plurality of windings therein; and a printed circuit board electrically connected to the dielectric coil.

The electronic device according to various example embodiments may be a device of various shapes. The electronic device may include, for example, a portable communication device (e.g., a smartphone), a computer device, a portable multimedia device, a portable medical device, a camera, a wearable device, or a home appliance. The electronic devices according to embodiments of the present document are not limited to the devices described above.

The various embodiments of the present document and the terms used therein are not intended to limit the technical features described in the present document to specific embodiments, but should be understood to include various modifications, equivalents, or substitutions of the corresponding embodiments. In connection with the description of the drawings, the similar reference numerals may be used for the similar or relevant constituent elements. The singular form of a noun corresponding to an item may include one or more of the items, unless the relevant context clearly indicates otherwise. In the present document, each of the phrases "A or B," "at least one of A and B," "at least one of A or B," "A, B or C," "at least one of A, B and C," and "at least one of A, B, or C" may include any of the items listed together in the corresponding phrase among those phrases, or any possible combination thereof. The terms such as "first", "second", or "first" or "second" may be used simply to distinguish a constituent element from other corresponding constituent elements and do not limit the constituent elements in any other respect (e.g., importance or order). In case that any (e.g., a first) constituent element is referred to as "coupled" or "connected" to another (e.g., a second) constituent element, with or without the terms "functionally" or "communicationally", it means that the constituent element may be connected to the other constituent element directly (e.g., wired), wirelessly, or through at least a third constituent element(s).

As used in various embodiments of the present document, the term "module" may include a unit implemented in hardware, software, or firmware, and may be used interchangeably with terms such as logic, logic block, component, or circuit, for example. The module may be a component that is integrally constituted, or a minimum unit of the component, or a part thereof, that performs one or more functions. For example, according to an embodiment, the module may be implemented in the form of an application-specific integrated circuit (ASIC). Thus, each "module" herein may comprise circuitry.

Various embodiments may be implemented as software (e.g., the program 140) including one or more instructions stored on a storage medium (e.g., the internal memory 136 or external memory 138) readable by a machine (e.g., the electronic device 101). For example, a processor (e.g., the processor 120) of the machine (e.g., the electronic device 101) may call and execute at least one of one or more instructions stored on the storage medium. This enables the machine to be operated to perform at least one function according to the at least one instruction called. One or more of the instructions that are described above may include code generated by a compiler or code that may be executed by an interpreter. The machine-readable storage medium may be provided in the form of a non-transitory storage medium. Here, "non-transitory" only means that the storage medium is a tangible device and does not include signals (e.g., electromagnetic waves), and this term does not distinguish between the case where the data is stored on the storage medium permanently and the case where the data is stored temporarily.

In some embodiments, methods according to various embodiments disclosed herein may be provided in a computer program product. The computer program product is a commodity and may be traded between a seller and a buyer. The computer program product may be distributed in the form of a device-readable storage medium (e.g., compact disc read only memory (CD-ROM)), or it may be distributed online (e.g., downloaded or uploaded) through an application store (e.g., Play Store™) or directly between two user devices (e.g., smartphones). In case of online distribution, at least a portion of the computer program product may be stored, or at least temporarily generated, on a device-readable storage medium, such as a manufacturer's server, an application store's server, or a memory of a relay server.

According to various embodiments, each constituent element (e.g., module or program) of the above-described constituent elements may include a single or plurality of objects, and some of the plurality of objects may be disposed separately in different constituent elements. In various embodiments, one or more constituent elements of the corresponding constituent elements described above, or operations may be omitted, or one or more other constituent elements or operations may be added. Alternatively or additionally, a plurality of constituent elements (e.g., modules or programs) may be integrated into a single constituent element. In this case, the integrated constituent element may perform one or more functions of the constituent element of each of the plurality of constituent elements in the same or similar manner as performed by the corresponding constituent element of the plurality of constituent elements prior to the integration. According to various embodiments, the operations performed by a module, program, or other constituent element may be executed sequentially, in parallel, iteratively, or heuristically, or one or more of the above operations may be executed in a different order, omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a housing;
   a hole formed in a portion of the housing;
   a storage space connected to the hole and provided inside the housing; and
   a fastener disposed inside the storage space and configured to fasten an external electronic device,
   wherein the fastener comprises:
      a support part configured to fix the fastener to the storage space;
      a coupler extending from the support part and having an opening formed in the center thereof in which an external pen is insertable; and
      two or more cutout parts formed by cutting out a portion of the coupler,
      wherein the two or more cutout parts include catching projections protruding from a portion of each of the two or more cutout parts, the catching projections being disposed to face each other in a direction toward the opening of the coupler, and
      wherein the two or more cutout parts are configured to provide a repulsive force against an external force in an inward direction or an outward direction of the opening,
   wherein the external pen comprises:
      a pen housing,
      a first end and a second end formed at opposite ends of the pen housing, at least a portion of the first end protruding outside of the hole of the housing upon the insertion, wherein the second end is positioned inside the storage space upon the insertion, and wherein the second end comprises:
an inclined portion forming a slope on a surface of the pen housing by increasing in diameter in a direction from the second end toward the first end,
a catching groove formed at an end of the inclined portion in a direction toward the first end, and comprising a diameter smaller than a maximum diameter formed by the inclined portion, and
a planar portion substantially perpendicular to the direction from the second end toward the first end, and wherein the two or more cutout parts include a contact portion formed at an end of the cutout part, which comes into contact with the planar portion of the external pen.

2. The electronic device of claim 1, comprising two or more catching projections protruding from a portion of each of the two or more cutout parts, and disposed to face each other in a direction toward the opening.

3. The electronic device of claim 1, wherein the two or more cutout parts form a symmetrical structure with respect to the opening.

4. The electronic device of claim 1, wherein the two or more cutout parts are configured to form the repulsive force in an inward direction of the opening when opened apart from each other in an outward direction of the opening.

5. The electronic device of claim 1, wherein the storage space comprises a communicating part into which the external pen is to be inserted, and an interruption portion configured to interrupt the support part to move away corresponding to the support part, and
wherein the support part is fixed to the storage space by at least the interruption portion.

6. The electronic device of claim 5, wherein a diameter of the support part is greater than a diameter of a connecting passage.

7. The electronic device of claim 5, wherein a maximum diameter of the opening is less than or equal to a diameter of a connecting passage.

8. The electronic device of claim 2, wherein a diameter of the opening formed by the two or more catching projections facing each other in an area of the opening is less than a maximum diameter of the opening.

9. The electronic device of claim 1, wherein the fastener comprises four cutout parts.

10. The electronic device of claim 1, wherein the fastener comprises any one or a combination of polyoxymethylene (POM), polyamide (PA), polypropylene (PP), polycarbonate (PC), polyethylene (PE), and thermoplastic polyurethane (TPU).

11. The electronic device of claim 1, wherein the external electronic device is an electronic pen,
wherein the electronic pen comprises:
a pen housing;
a first end, at least a portion of which is to protrude outside of the hole upon the insertion; and
a second end configured to be positioned inside the storage space upon the insertion, and
wherein the second end comprises:
an inclined portion forming a slope on a surface of the pen housing by increasing in diameter in a direction from the second end toward the first end;
a catching groove formed at an end of the inclined portion in a direction toward the first end, and comprising a diameter smaller than a maximum diameter formed by the inclined portion; and
a planar portion extending from the catching groove and configured to interrupt the catching groove in a direction perpendicular to the diameter.

12. The electronic device of claim 11 wherein a minimum diameter of the cutout parts is less than a maximum diameter of the inclined portion of the electronic pen and greater than or equal to a minimum diameter of the inclined portion of the electronic pen, and
wherein a maximum diameter of the inclined portion is greater than the minimum diameter of the cutout parts.

13. The electronic device of claim 12, wherein the cutout parts are configured to be opened in an outward direction of the opening upon the insertion by the inclined portion of the electronic pen, and
wherein the cutout parts which are configured to be opened to generate a repulsive force to be applied to an area in which an end of the cutout parts is in contact with the inclined portion in an inward direction of the opening, and a buffering force to push the electronic pen by a slope of the inclined portion in an outward direction of the housing.

14. The electronic pen of claim 12, wherein the catching groove of the electronic pen, upon the insertion, is configured to interrupt a coupling portion of the fastener in a direction opposite to the insertion.

15. The electronic pen of claim 12, wherein the planar portion of the electronic pen, upon insertion, is configured to interrupt a coupling portion with respect to a direction of the insertion.

* * * * *